United States Patent [19]

Stampfli

[11] 3,879,068

[45] Apr. 22, 1975

[54] SUPPORT DEVICE FOR FLUID CONTROL SYSTEMS

[75] Inventor: Harald Stampfli, Geneva, Switzerland

[73] Assignee: Lucifer S.A., Geneva, Switzerland

[22] Filed: Dec. 6, 1972

[21] Appl. No.: 312,721

[30] Foreign Application Priority Data
Dec. 17, 1971 Switzerland.................... 18532/71

[52] U.S. Cl.............. 285/137 R; 137/271; 285/406
[51] Int. Cl............................................. F16l 39/00
[58] Field of Search......... 137/271; 285/137 R, 363, 285/364, 405, 406, 336; 24/81 B, 81 PE, 73 B

[56] References Cited
UNITED STATES PATENTS

| | | | |
|---|---|---|---|
| 301,512 | 7/1884 | Mixer | 285/336 |
| 3,091,487 | 5/1963 | Gallagher et al. | 285/406 X |
| 3,301,578 | 1/1967 | Platt et al. | 285/336 X |
| 3,516,442 | 6/1970 | Munroe | 251/367 |
| 3,636,593 | 1/1972 | Buttriss et al. | 24/73 B X |
| 3,680,589 | 8/1972 | Jeans et al. | 137/271 X |
| 3,756,274 | 9/1973 | Wolfgramm | 137/271 X |

*Primary Examiner*—Alfred R. Guest
*Attorney, Agent, or Firm*—Emory L. Groff, Jr.

[57] ABSTRACT

The device comprises at least two juxtaposed blocks and at least one assembly member pressing one surface of one of the blocks in which at least one passage opens, against a surface of the other block. Contiguous surfaces of the two blocks have, close to the common edge with said surfaces, conformations forming with the assembly member a three-directionally rigid coupling.

6 Claims, 6 Drawing Figures

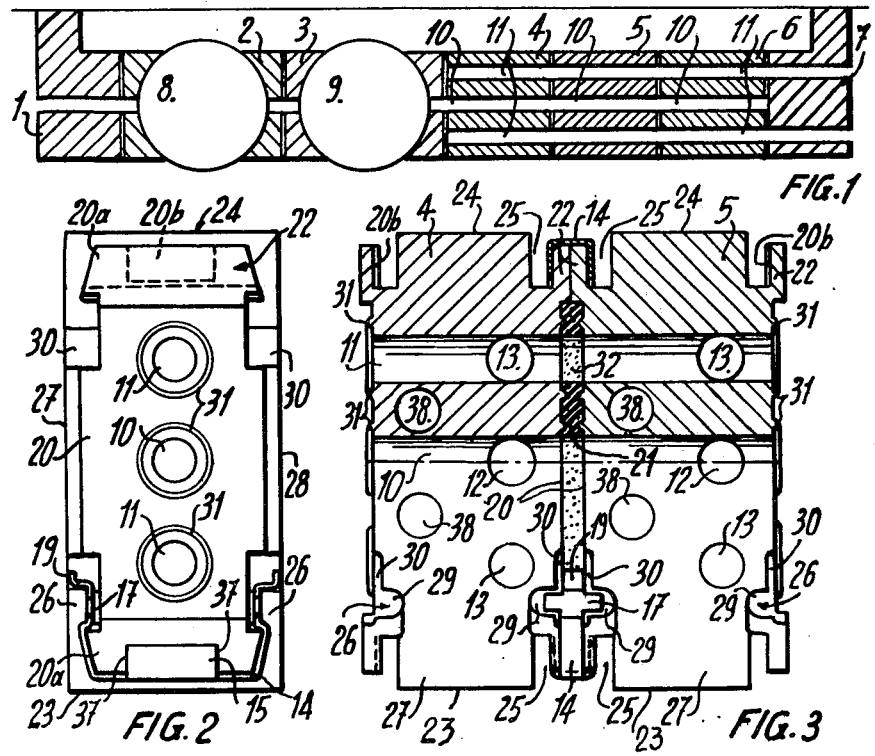
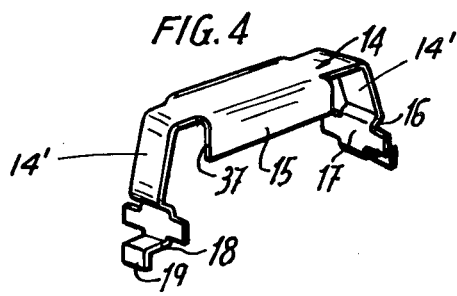
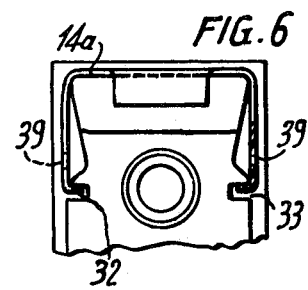
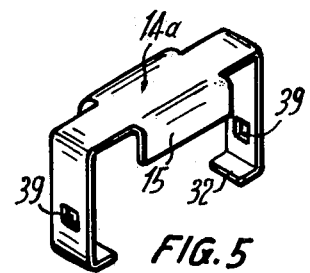

SUPPORT DEVICE FOR FLUID CONTROL SYSTEMS

In fluid control systems it is known to connect in series with a source of fluid, for example compressed air, the equipment for the treatment and regulation of the fluid and electromagnetic control valves for the installation.

To make it possible to change the valves of such control systems, the valves are generally mounted on blocks of substantially parallelepipedic shape which are assembled to one another with the interposition of seals.

It has already been proposed to assemble to one another the contiguous blocks of pneumatic control devices by means of shaped parts housed in corresponding cavities of the blocks to be assembled, or by means of clamping devices, the free ends of which are engaged in grooves made in these blocks.

However, these known connecting devices permit rigid coupling of the blocks only in two directions, and a centering member borne by the blocks or a supplementary part is required for ensuring rigidity of the coupling in the third direction.

It is an object of the invention to provide a device comprising at least two juxtaposed blocks for supporting apparatuses included in a fluid control system and at least one connecting member pressing one surface of one of the blocks, in which at least one passage opens, against one surface of the other block.

This device is characterized in that contiguous surfaces of the two blocks are provided, close to their common edge, with the said surfaces pressed against one another, with conformations forming together one element of a three directionally rigid coupling of which the other element is the said connecting member.

The accompanying drawing shows, diagrammatically and by way of example, one embodiment of a device according to the invention and modifications thereof. In said drawing:

FIG. 1 is a diagrammatic view of a portion of a pneumatic control system.

FIG. 2 is an end view of a block provided with one connecting member.

FIG. 3 is a side-view, partly cut away, of two blocks assembled to one another by two connecting members.

FIG. 4 is a perspective view, on a larger scale, of one connecting member, as shown in FIGS. 2 and 3.

FIG. 5 is a perspective view of a modification of the connecting member shown in FIG. 4.

FIG. 6 is an end view of a part of a block provided with the connecting member of FIG. 5.

The portion of the pneumatic control system shown in FIG. 1 comprises an inlet ferrule 1 for compressed air, a filter support 2, a reducing valve support 3, valve support blocks 4, 5 and 6, and a compressed air delivery ferrule 7.

The ferrule 1 constitutes the intake end, into the pneumatic system, of the compressed air used as control fluid in an installation or for actuating parts of such installation responsive to pneumatic control means.

After passing filter 8 and reducing valve 9, respectively mounted on supports 2 and 3, the compressed air enters an inlet passage for compressed air 10 provided in support blocks 4, 5 and 6 of four way valves controlling the delivery of compressed air into corresponding branches of the pneumatic control system.

Side by side with the compressed air inlet passage 10 of blocks 4 to 6, delivery passages 11 for compressed air connected to the exhaust ferrule 7 are provided. The inlet 10 and delivery 11 passages are connected to four way electromagnetic valves through passages 12 and 13 respectively. These valves (not shown) are connected in known manner, to the part of the installation which they control, through passages 38.

It is thus possible, for example, to send alternately compressed air to the two sides of a double acting cylinder, these two sides of the cylinder being alternately also connected to the exhaust, through the four way valve, passages 10 and 11 of its supporting block, and ferrules 1 and 7.

The juxtaposed blocks 4, 5 and 6 are assembled to one another by two connecting members constituted by a spring strip 14 bent in the shape of a U such as shown in FIG. 4. The base of the U of this strip 14 is provided, along its longitudinal edges, with upwards directed extensions 15 substantially parallel to the arms 14' of the U on both sides of the base. The arms 14' of the U of strip 14 are bent towards one another near their free end at 16, this bent portion being provided with an extension 17 of T shape substantially parallel to the arms of the U, said extension being itself provided with an outwardly bent extension 18, followed by an end portion 19 substantially parallel to the arms of the U.

The surfaces 20 of blocks 4 and 5, designed to be pressed against one another with the interposition of seal 21, are provided, along two opposite edges, with shoulders forming the outer surface 20a of lips 22 spaced from the corresponding contiguous surfaces 23, 24 of the two blocks 4 and 5 by a cut-out 25 formed in each of these surfaces 23, 24 of the blocks, parallel to the surfaces 20. The surface of the lips 22 on the side of cut-out 25 is provided with a recess 20b to accommodate one of the extensions 15 of a spring strip 14.

Notches 26 are formed furthermore in the edges of the surfaces 27 and 28 on both sides of the surfaces 23 and 24 of the blocks 4 and 5, adjacent each of the lips 22. These notches 26 include a deeper portion 29, closest to the lip 22, designed to receive one of the T shaped extensions 17 of the spring strip 14, followed by a shallower portion 30 intended to receive one of the ends 19 of the spring strip 14.

As shown in FIG. 3, the blocks 4 and 5 are assembled to one another by two spring strips 14. The upwardly directed extensions 15 of the longitudinal edges of the base of the U of each strip 14 are respectively seated in the recesses 20b of two contiguous lips 22 of the two blocks. The surfaces 20a of these contiguous lips 22 are thus firmly applied against each other, whilst a sealing joint, formed for example by a rubber strip 21, is interposed between the surfaces 20 facing one another of the two blocks. The ends of the arms of the U of the strips 14 are engaged in the notches 26 formed in the two blocks 4 and 5, set back with respect to their cut outs 25.

The T shaped portions 17 of the strips 14 are seated in the deeper portions 29 of these notches 26 of the two blocks 4 and 5, straddling the latter. The free ends 19 of the strips 14 are furthermore seated in the shallower portions 30 of these notches 26 and are in practice inserted between the contiguous surfaces 27 and 28 of these two blocks.

There is thus formed a very rigid coupling of the two blocks 4 and 5. In fact, the contiguous lips 22 of the two blocks are pressed against one another by the extensions 15 of the strips 14.

The T shaped portions 17 and especially the bars of the T engaged in the deep portions 29 of the notches 26, straddling the two blocks 4 and 5, prevent any relative displacement of these blocks with respect to one another in the plane of FIG. 3.

Finally, the lateral edges 37 of the extensions 15, clamped in the recesses 20b of the contiguous lips 22 of the two blocks 4 and 5, prevent any relative displacement of the latter with respect to one another in a plane perpendicular to FIG. 3.

It is easy to uncouple the spring strips 14 connecting the blocks 4 and 5, for example by introducing the end of a screw-driver into the notch portion 30, under the end portion 19 of one arm of the U of each spring strip 14.

As shown in FIGS. 2 and 3, ridges 31 surrounding the openings of the passages 10 and 11 on the surface 20 of the blocks 4 and 5 to grip the periphery of the corresponding openings 32 in seal 21 inserted between surface 20 facing one another of blocks 4 and 5, when assembling the latter.

Of course, the usefulness of the coupling device described is not restricted to the assembly of blocks 4 to 6 bearing four way valves. It can be used also to couple together support blocks for two and three way valves.

This device also permits the connection of the compressed air inlet ferrule to the support 2 of filter 8 and the latter to the support 3 of reducing valve 9. In the same way, the support 3 of reducing valve 9 may be connected to the first valve support block 4 and the last valve support block 6 to the ferrule 7.

As shown in FIG. 1, the compressed air inlet passage from ferrule 1 is thus directly connected to the assembly of inlet passages 10 of the blocks 4 to 6 through the filter 8 and the reducing valve 9. Similarly, the assembly of the delivery passages 11 of blocks 4 to 6 is thus connected directly to the delivery ferrule 7.

Numerous alterations to the embodiment of the device described above may be contemplated. For example, the shape of the notches 26 formed in the parts 1 to 7 on both sides of the lips 22, and that of the terminal portions of the arms of the U of the assembly strips 14 may be simplified. The latter could be assembly inwardly bent towards one another at a right angle to form anchoring tongues 32, engaged in anchoring notches 33 of two adjacent blocks (see FIGS. 5 and 6). It is advantageous in this case to provide openings 39 in the arms of the U of such connecting strips 14a to permit the introduction therein of a tool when uncoupling of parts 1 to 7 is required.

I claim:

1. A support device for apparatuses forming part of a fluid control system, said device comprising at least two juxtaposed blocks, at least one connecting member pressing one surface of one of said blocks against a surface of the other block, at least one passage in each of said blocks opening into said surfaces, the thus contiguous surfaces of said at least two blocks being provided adjacent their common edges when said surfaces are pressed against one another, with conformations which together form one element of a three directionally rigid coupling of which the other element is said at least one connecting member, said conformations including lips forming an extension of part of the edges of said block surfaces which are pressed against one another, said at least one connecting member comprising a generally U-shaped bent elastic strip, said strip including means engaging said lips to provide a clip engaged thereover, said last mentioned means comprising extensions projecting angularly from the longitudinal edges of the base of the U and substantially parallel to the arms thereof.

2. Device according to claim 1, wherein the surface of said lips on the opposite side of the surface pressed against the other is provided with a recess for the corresponding angularly directed extension of the longitudinal edges of the base of the U of the connecting member.

3. Device according to claim 1, wherein two surfaces of each block having a common edge with both surfaces on which said lips are provided, are each provided with a notch formed in their edge close to each of said lips and set back with respect thereto.

4. Device according to claim 1 wherein portions of the arms of said clip are bent toward each other and include a T shaped extension and an end portion extending angularly from said T shaped extension, the edges of said block surfaces which are pressed against one another each including notches close to said lips and into which said T shaped extension and end portion fit.

5. A support device for apparatuses forming part of a fluid control system, said device comprising at least two juxtaposed blocks, at least one connecting member pressing one surface of one of said blocks against a surface of the other block, at least one passage in each of said blocks opening into said surfaces, the thus contiguous surfaces of said at least two blocks being provided adjacent their common edges when said surfaces are pressed against one another, with conformations which together form one element of a three directionally rigid coupling of which the other element is said at least one connecting member, said conformations including lips forming an extension of part of the edges of said block surfaces which are pressed against one another, said at least one connecting member comprising a generally U-shaped bent elastic strip, said strip including means engaging said lips to provide a clip engaged thereover, said U-shaped bent elastic strip further including a base, the longitudinal edges of which are provided with extensions projecting angularly therefrom and substantially parallel to the arms of the U to form a clip engaged over said pair of lips and two surfaces of each block, having a common edge with both surfaces on which said lips are provided, said surfaces each provided with a notch formed in their edge close to each said lips and set back with respect to said lips, and wherein portions of the arms of the U of said elastic strip are bent towards one another so as to be anchored in said notches when said pair of lips is engaged in said clip.

6. Device according to claim 5, wherein said notches comprise two parts of different depths, the deepest part occuring in the immediate vicinity of said lips, and portions of the arms of the U bent towards one another are each extended by a T shaped portion, itself extended by a portion first bent towards the outside of the arms of the U, then bent again substantially parallel to form a terminal extension of said arms, the whole being arranged so that the bar of said T is engaged in said deepest part of the notches facing one another of the two blocks and said terminal extension is engaged in the shallowest part of the notches.

* * * * *